(12) United States Patent
McHugh (10) Patent No.: US 9,157,547 B2
(45) Date of Patent: Oct. 13, 2015

(54) VALVE WEDGE TRIM

(71) Applicant: Cameron International Corporation, Houston, TX (US)

(72) Inventor: Edmund McHugh, Longford (IE)

(73) Assignee: Cameron International Corporation, Houston, TX (US)

( * ) Notice: Subject to any disclaimer, the term of this patent is extended or adjusted under 35 U.S.C. 154(b) by 423 days.

(21) Appl. No.: 13/659,356

(22) Filed: Oct. 24, 2012

(65) Prior Publication Data

US 2014/0109997 A1  Apr. 24, 2014

(51) Int. Cl.
  *F16K 31/12* (2006.01)
  *F16K 3/34* (2006.01)

(52) U.S. Cl.
  CPC . *F16K 31/12* (2013.01); *F16K 3/34* (2013.01); *Y10T 137/7793* (2015.04)

(58) Field of Classification Search
  CPC ............. F16K 1/38; F16K 3/34; F16K 31/12; F16K 47/04; Y10T 137/7793
  USPC .......................... 251/121–122, 205, 332–334
  See application file for complete search history.

(56) References Cited

U.S. PATENT DOCUMENTS

| | | | |
|---|---|---|---|
| 1,135,280 A | 4/1915 | Hamilton | |
| RE17,824 E * | 10/1930 | Lee | 251/122 |
| 3,071,344 A * | 1/1963 | Banks | 251/210 |
| 3,145,010 A * | 8/1964 | Karr, Jr. | 251/210 |
| 3,228,655 A * | 1/1966 | Weise | 251/122 |
| 3,318,577 A * | 5/1967 | Banks | 251/332 |
| 3,428,076 A * | 2/1969 | Lowe | 251/333 |
| 3,809,362 A * | 5/1974 | Baumann | 251/332 |
| 3,831,900 A * | 8/1974 | Matousek et al. | 251/122 |
| 3,857,542 A | 12/1974 | Heymann | |
| 3,952,994 A * | 4/1976 | Karr, Jr. | 251/210 |
| 4,921,213 A | 5/1990 | Geiser | |
| 5,431,188 A | 7/1995 | Cove | |
| 5,687,949 A * | 11/1997 | Dukas et al. | 251/122 |
| 6,095,186 A * | 8/2000 | Nagel | 137/516.29 |
| 6,293,514 B1 * | 9/2001 | Pechoux et al. | 251/122 |
| 7,004,448 B2 * | 2/2006 | Suter et al. | 251/122 |
| 2011/0094607 A1 | 4/2011 | Elliott | |

OTHER PUBLICATIONS

Copenheaver, International Search Report and Written Opinion for PCT/US2013/066283, mailed Mar. 21, 2014.

* cited by examiner

*Primary Examiner* — John Bastianelli
(74) *Attorney, Agent, or Firm* — Eubanks PLLC (57) ABSTRACT

A choke having a trim that includes a wedge-shaped member ("wedge") and a cage with an opening for receiving the wedge. The wedge includes a first surface and a second surface that is angled with respect to the first surface. As the wedge is positioned into the opening of the cage, the space between the second surface and a third surface inside the opening forms a throttling orifice that restricts the flow of fluid. The size of the throttling orifice is variable depending on the position of the wedge relative to the cage. The trim can provide a positive shut-off point that is separate from the throttling area.

17 Claims, 10 Drawing Sheets

VALVE WEDGE TRIM

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

In order to meet consumer and industrial demand for natural resources, companies often invest significant amounts of time and money in searching for and extracting oil, natural gas, and other subterranean resources from the earth. Particularly, once a desired subterranean resource is discovered, drilling and production systems are often employed to access and extract the resource. These systems may be located onshore or offshore depending on the location of a desired resource.

Such systems generally include a wellhead assembly through which the resource is extracted. These wellhead assemblies may include a wide variety of components that control drilling and/or extraction operations. Such components may include one or more production trees (often referred to as "Christmas trees"), control modules, a blowout preventer system, and various casings, valves, fluid conduits, and the like, that generally facilitate the extraction of resources from a well for transport to the surface. In some applications, trees may also be used to inject materials, such as water and/or long chain polymers, into a well. As can be appreciated, production trees often include certain elements for flow monitoring and control, such as choke valves (often referred to as a "choke"), pressure regulators, and flow meters, as well as chemical injection metering valves, various sensors, and so forth.

During resource extraction, the flow rate of resources extracted from a well may be regulated using flow control devices, such as the above-mentioned choke. Chokes generally control flow rate by using an adjustable choke trim to create a restriction in a flow path, thus throttling the flow. The choke trim may include both a movable component and a fixed component, such as is the case with conventional needle and seat trims (sometimes called gate and seat trims). For example, in this case, the needle may be coupled to an actuator that is able to vary the position of the needle relative to the seat. Accordingly, the restriction provided by the choke trim in this case is variable and depends on the position of the needle relative to the seat. For example, the degree of flow restriction may increase as the needle is moved closer to the seat and may decrease as the needle is moved further away.

The aforesaid needle and seat trim configuration has, however, certain drawbacks. For instance, needle and seat trims have a relatively small throttling area (e.g., a circular region between the needle and seat). Generally, erosion is most heavily concentrated at this throttling point and, therefore, trims having small throttling areas, such as needle and seat trims, tend to be affected by erosion more quickly. Further, when fluid flows through the restriction created by the trim, the fluid velocity increases and accelerates while pressure drops. However, if fluid pressure drops quickly to a level that is less than vapor pressure and then subsequently rises quickly to a level greater than vapor pressure, this can cause the sudden formation and collapse of bubbles, known as cavitation. Cavitation may cause significant wear to the choke and adjacent/associated components.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Embodiments of the present disclosure relate generally to a wedge and cage trim for use in a valve, such as a choke. In one embodiment, the wedge and cage trim includes a wedge-shaped member (a "wedge") and a cage. The cage has an opening that extends through the body of the cage and is configured to receive the wedge. In one embodiment, the position of the wedge may be adjusted using an actuator. The wedge includes a first surface and a second surface that is angled with respect to the first surface. As the wedge is positioned into the opening of the cage, the space between the second surface and a third surface inside the opening forms a throttling orifice that restricts the flow of fluid. The size of this throttling orifice may be varied depending on the position of the wedge relative to the cage. For instance, the size of the throttling orifice may decrease as the wedge is positioned further into the cage and may increase as the wedge is positioned further out of the cage. In other embodiments, the wedge and cage trim is capable of providing a positive shut-off point that is separate from the throttling area. For instance, in one embodiment, a stem attached to the wedge may contact a seal located on the body of the cage.

Various refinements of the features noted above may exist in relation to various aspects of the present embodiments. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of some embodiments without limitation to the claimed subject matter.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein.

DETAILED DESCRIPTION OF SPECIFIC EMBODIMENTS

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not require any particular orientation of the components.

Figure 1:
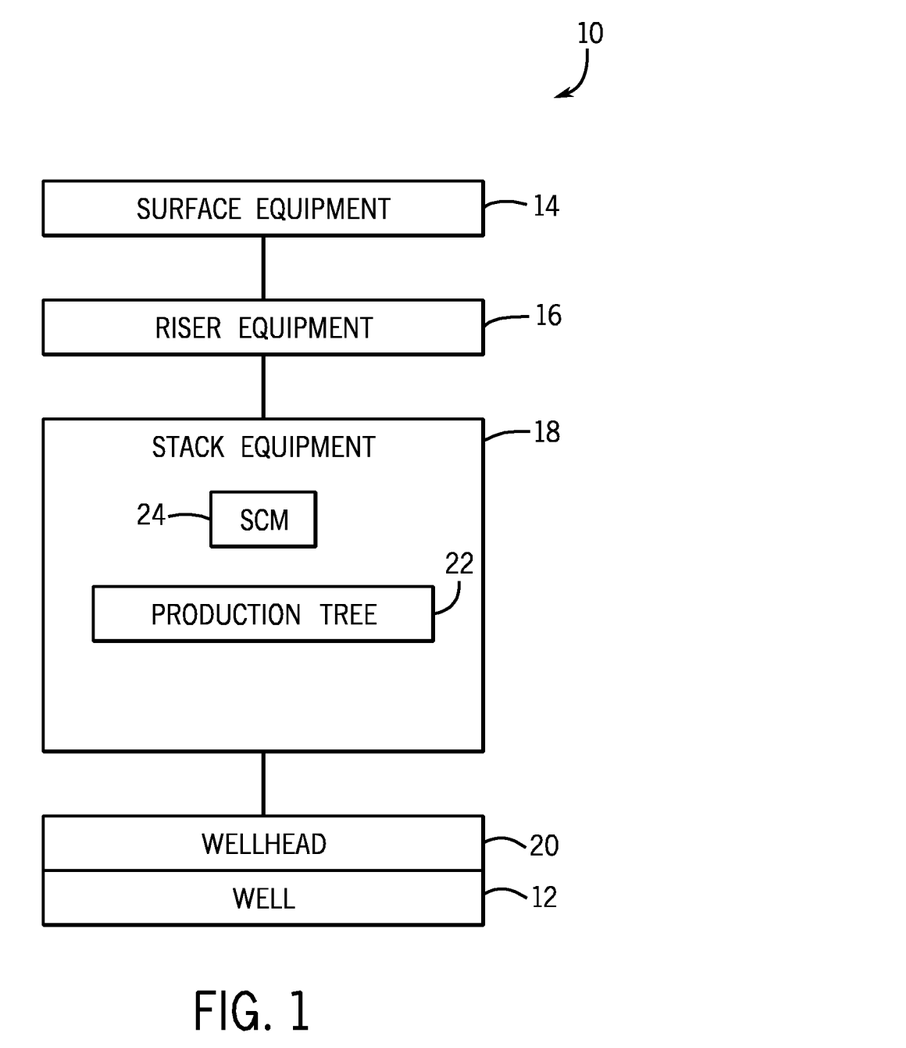
FIG. 1 depicts a resource extraction system that includes a production tree in accordance with one embodiment of the present disclosure.

Referring initially to FIG. 1, an exemplary resource extraction system 10 is illustrated in accordance with an embodiment of the present invention. The system 10 is configured to facilitate the extraction of a resource, such as oil or natural gas, from a well 12. As shown, the system 10 includes a variety of equipment, such as surface equipment 14, riser equipment 16, and stack equipment 18, for extracting the resource from the well 12 by way of a wellhead 20. The system 10 may be used in a variety of drilling or extraction applications. Further, while the system 10 is depicted as an offshore or "subsea" system, it will be appreciated that onshore systems are also available. In the depicted system 10, the surface equipment 14 is mounted to a rig located above the surface of the water, whereas the stack equipment 18 is coupled to the wellhead 20 proximate the sea floor. The surface equipment 14 and stack equipment 18 may be coupled to one another by way of the riser equipment 16.

As can be appreciated, the surface equipment 14 may include a variety of devices and systems, such as pumps, power supplies, cable and hose reels, control units, a diverter, a gimbal, a spider, and the like. Similarly, the riser equipment 16 may also include a variety of components, such as riser joints, fill valves, control units, and a pressure-temperature transducer, to name but a few. The riser equipment 16 may facilitate transmission of extracted resources (e.g., oil and/or gas) to the surface equipment 14 from the stack equipment 18 and the well 12.

The stack equipment 18 of FIG. 1 includes a production tree 22, also commonly referred to as a "Christmas tree," and a subsea control module (SCM) 24. The tree 22 may include components that control the flow of an extracted resource out of the well 12 and upward to the riser equipment 16 which in turn facilitates the transmission of the extracted resource upward to the surface equipment 14, as discussed above. For instance, the tree 22 may include various valves and conduits, a flow meter, sensors, and so forth. In some embodiments, the tree 22 may also provide additional functions, including chemical injection functionality and pressure relief. As will be discussed in further detail below, the tree 22 may include a choke that is controlled using an actuator to help regulate the flow rate of materials extracted from the well 12.

The subsea control module (SCM) 24 provides for electronic and/or hydraulic control of the various components of the stack equipment 18. For example, the SCM 24 may include controller that provides for communication with control equipment at the surface (e.g., part of the surface equipment 12). The controller may receive data acquired by sensors located on the tree 22 and relay such data to surface control equipment. In some embodiments, multiple control modules 24 may be provided with the stack equipment 18 for redundancy purposes. Further, though not specifically shown in FIG. 1, some embodiments of the resource extraction system 10 may include a blowout preventer system having one or more ram-type and/or annular blowout preventers. A blowout preventer system of this sort may be located between the stack equipment 18 and riser equipment 16 and may include one or more ram-type and/or annular blowout preventers.

Figure 2:
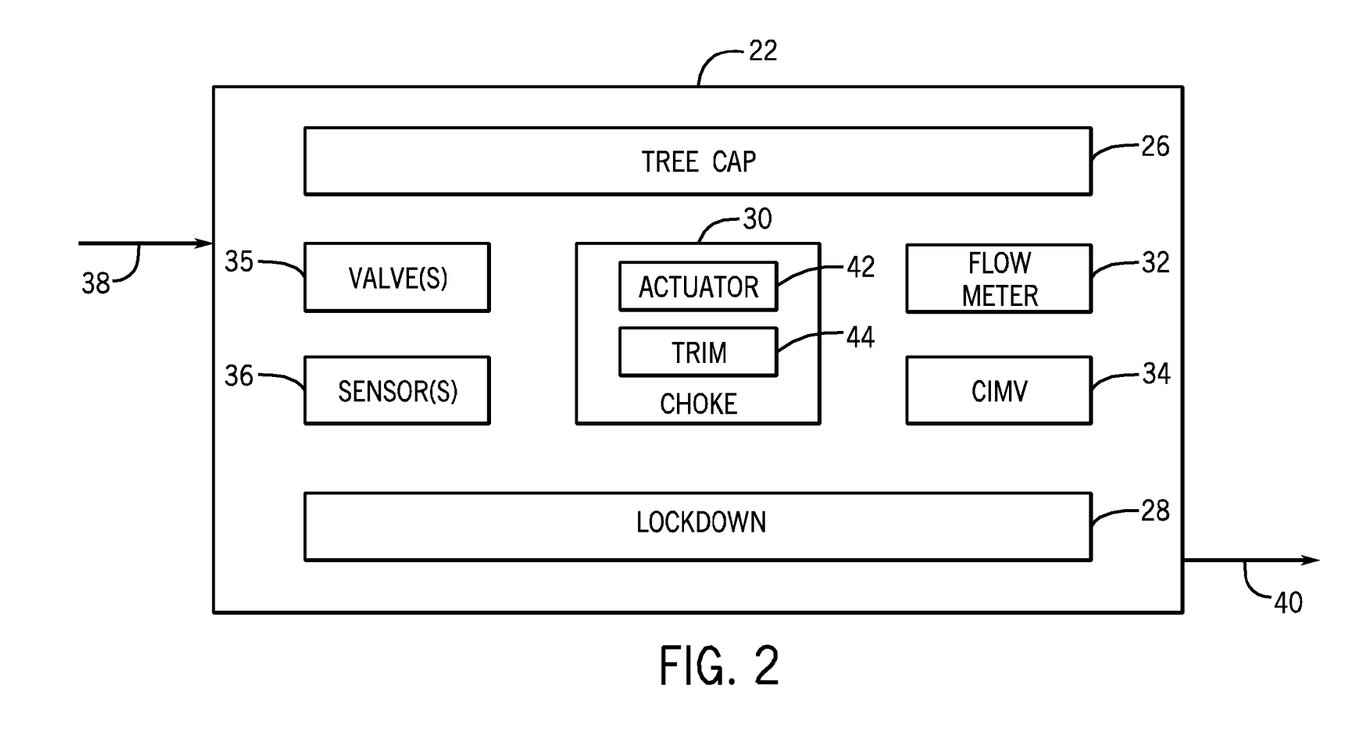
FIG. 2 is a block diagram illustrating a production tree having a choke in accordance with one embodiment of the present disclosure.

FIG. 2 is a simplified representation of a tree 22 that may be part of the stack equipment 18 depicted in FIG. 1. The illustrated tree 22 includes various components, such as a tree cap 26, lockdown element 28, choke 30, flow meter 32, chemical injection metering valve(s) 34, safety valve(s) 35, and sensor(s) 36. Typically, the lockdown element 28, which may include one or more clamping devices, secures the tree 22 onto the wellhead 20. The tree cap 26 provides an access point through which components of the tree 22 may be accessed for servicing and/or commissioning. In some embodiments, the tree 22 may include a water injection tree, a gas injection tree, a manifold assembly, or a process module.

Resources extracted during operation of the system 10 enter the tree 22 via a conduit 38 and flow through various components of the tree 22. For example, resources extracted from the well 12 may flow through the choke 30 which is used to control the flow rate of the resources as they are directed upwards to the riser equipment 16 and surface equipment 14 via a conduit 40. Thus, the path from conduit 38 to conduit 40 may be referred to as a flow path through the tree 22. Further, while extracted resources may flow through the tree 22 from conduit 38 to conduit 40, in some applications, the tree 22 may also be used to inject materials into a well (from conduit 40 to conduit 38). For example, pressure in wells and reservoirs tends to drop over time. Thus, it may be beneficial to inject water into an aging well to increase pressure. In such applications, it may also be useful to inject long chain polymers into a well, which helps keep water and oil separate.

As will be discussed in more detail below with reference to FIG. 3, the choke 30 includes a trim 44 that provides a variable restriction in the flow path. Specifically, the trim 44 includes a movable wedge-shaped member (a "wedge") and a cage. The wedge may be coupled to an actuator 42 that is configured to move the wedge toward and away from the cage, i.e., into and out of an opening in the cage. As used herein, the term "wedge and cage" trim may be used to refer to a trim having these types of components.

The flow meter 32 may be fluidly coupled to the choke 30 and may include a multiphase flow meter for measuring characteristics of individual phase flow rates during resource extraction. For example, a multiphase flow meter 32 may measure flow rates for oil, water, and gas mixtures extracted from the well 12. As shown in the illustrated embodiment, the tree 22 also includes at one or more safety valves 35 (e.g., gate valves), such as a primary safety valve and secondary safety valve, which may be operated to shut off the well, such as in the case of emergency situations or for maintenance purposes. In the illustrated embodiment, the tree 22 also has one or more chemical injection metering valves 34, which may be used for the injection of chemicals in resource extraction applications. For instance, certain chemicals, such as low-dose hydrate inhibitors, may be introduced into the flow of the extracted resources from the well 12 at one or more chemical injection points. This may help prevent blockages and/or corrosion, which improves production output and extends the operational life of the resource extraction system 10.

The sensors 36 of the tree 22 may include an arrangement of multiple sensors for acquiring various types of data points relating to resource extraction. For example, the sensors 36 may include one or more of pressure and temperature transducers, acoustic sand detection sensors, sand erosion/corrosion monitoring sensors, and so forth. As will be appreciated, each of these components may provide operational data to the SCM 24, which may further relay this data to surface control equipment.

Figure 3:
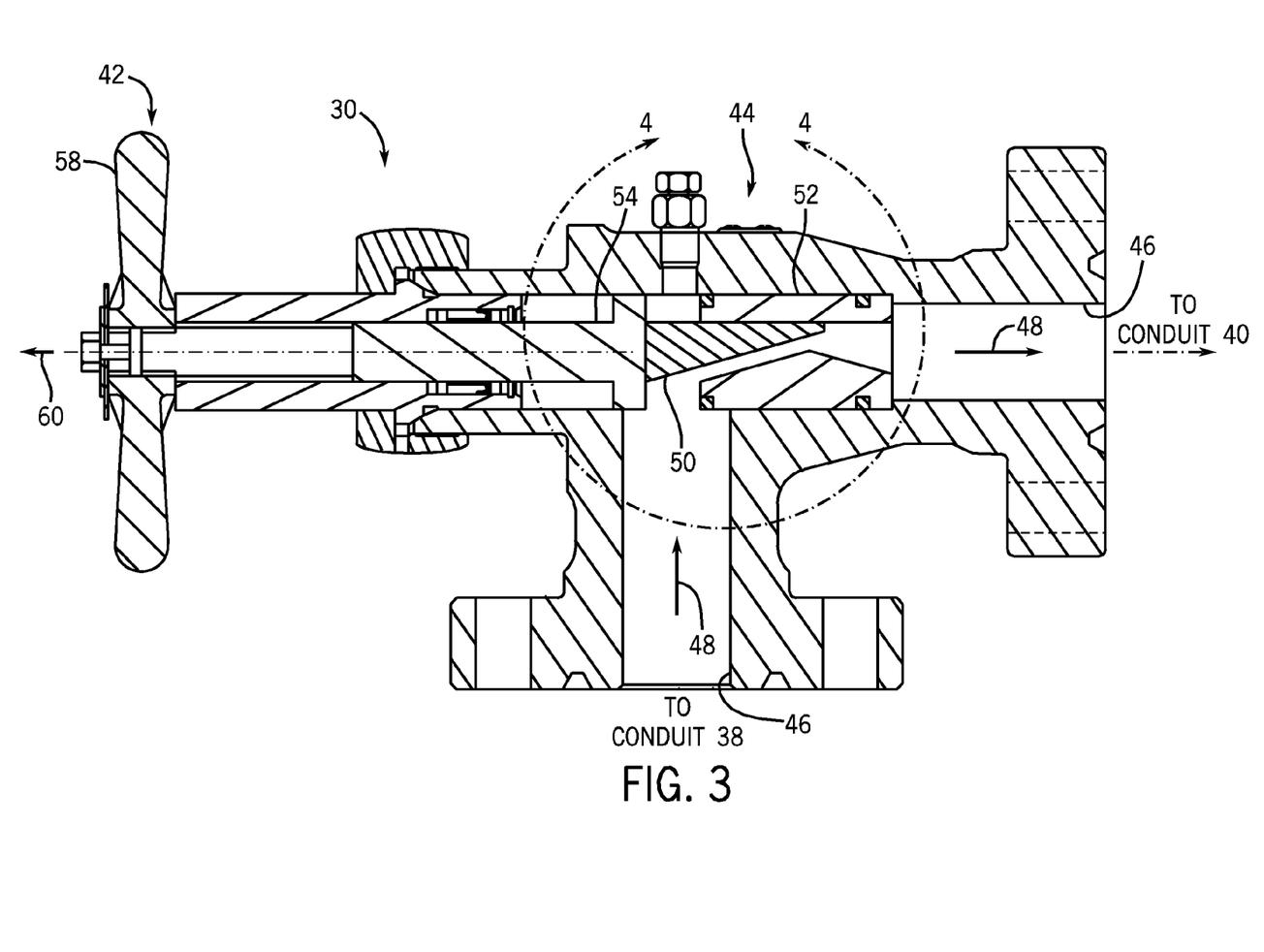
FIG. 3 is a cross-sectional cutaway view showing the choke of FIG. 2, the choke having a wedge and cage trim in accordance with one embodiment of the present disclosure.
Figure 4:
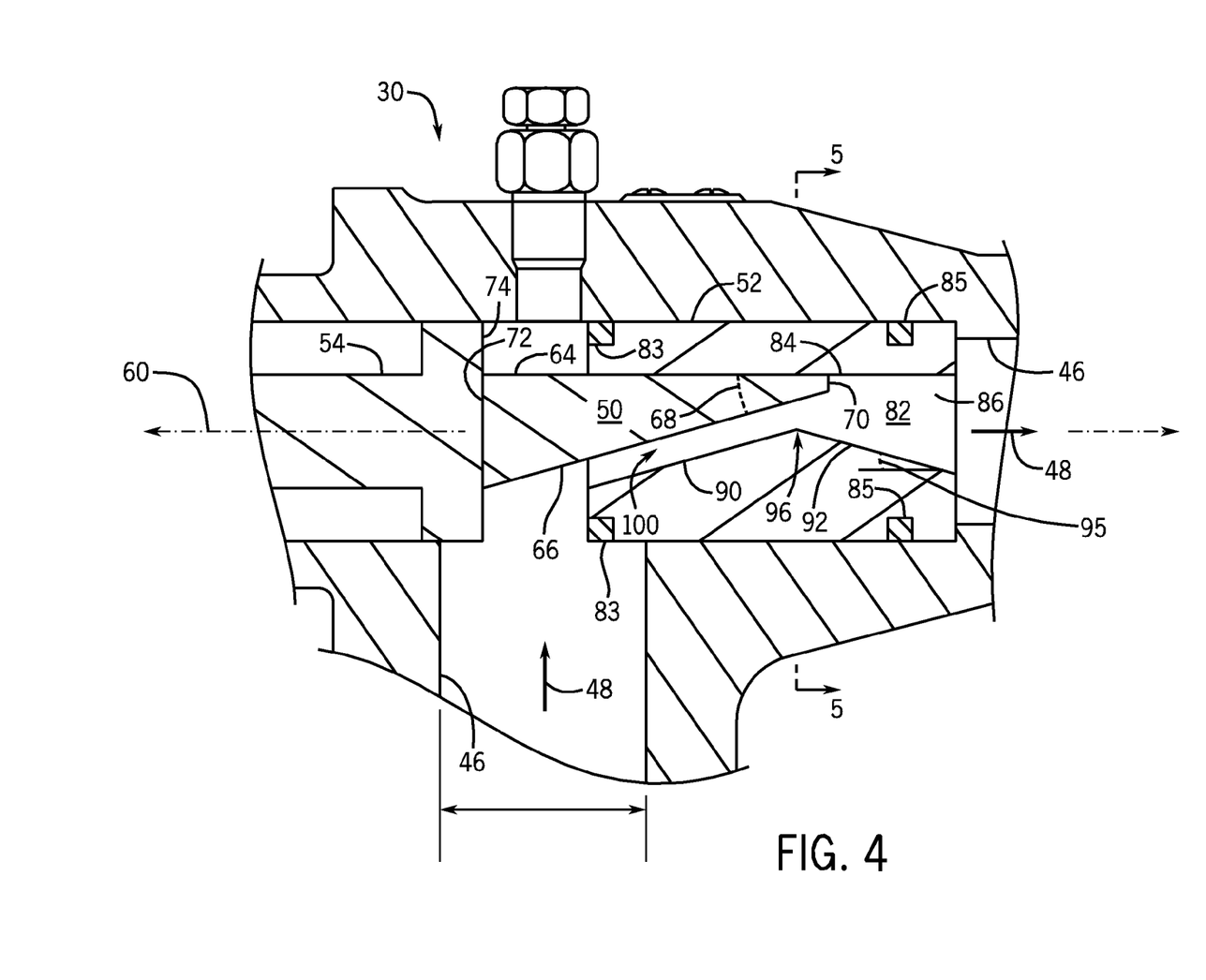
FIG. 4 is a more detailed view of the wedge and cage trim within the area enclosed by line 4-4 of FIG. 3.
Figure 5:
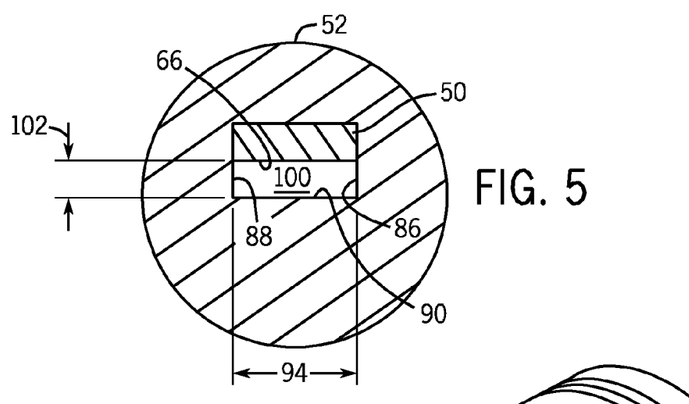
FIG. 5 is a cross-sectional view of the wedge and cage trim taken along line 5-5 of FIG. 4.
Figure 6:
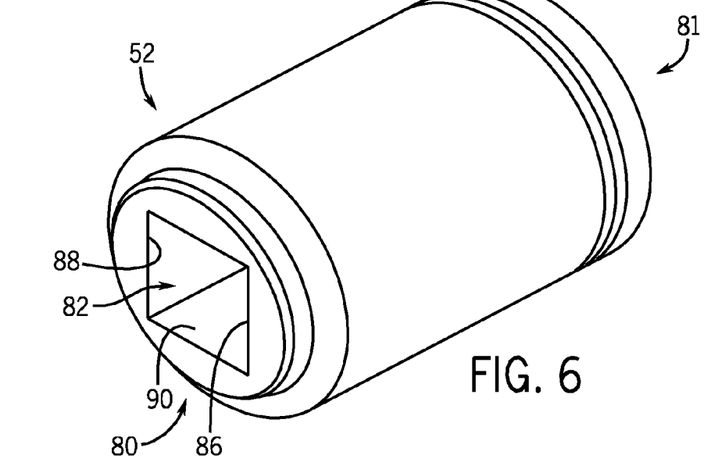
FIG. 6 is a perspective view showing the cage of the wedge and cage trim removed from the choke of FIG. 3.
Figure 7:
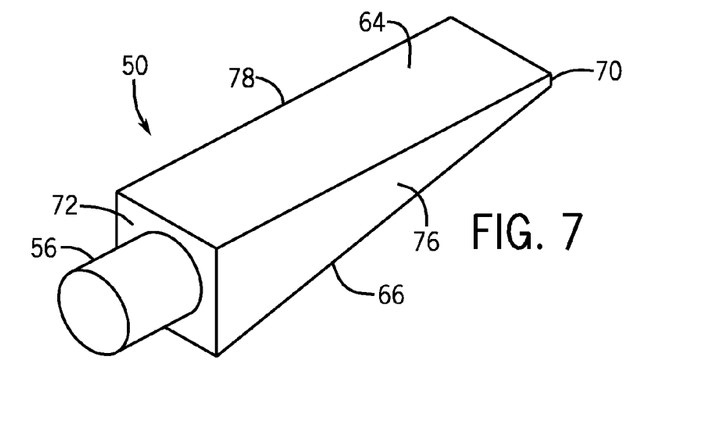
FIG. 7 is a perspective view showing the wedge of the wedge and cage trim removed from the choke of FIG. 3.

With these points in mind, an embodiment of a choke 30 having a wedge and cage trim 44 is discussed now with reference to FIGS. 3 to 7. Specifically, FIG. 3 shows a cross-sectional view of a choke 30 with a wedge and cage trim 44 in accordance with one embodiment. FIG. 4 shows a more detailed view of the wedge and cage trim 44 of FIG. 3 taken in the region enclosed by line 4-4 of FIG. 3, while FIG. 5 shows a cross-sectional view of the wedge and cage trim 44 taken through line 5-5 of FIG. 4. Further, FIGS. 6 and 7 show the cage and the wedge, respectively, removed from the choke 30 of FIG. 3. To better describe this embodiment of the wedge and cage trim 44, FIGS. 3 to 7 will be referenced concurrently below.

As shown, the choke 30 includes a wedge and cage trim 44. The trim 44 is disposed in a passage 46 through the choke 30, wherein the passage 46 provides a path 48 for the flow of fluids, as indicated by directional arrows in FIGS. 3 and 4. Specifically, the illustrated flow path 48 depicts a path through the choke 30 in an application where fluid is being extracted from a well. However, as discussed above, some applications may include the injection of fluids (e.g., water and long chain polymers) into a well. In the latter case, the directional arrows could be reversed, with the flow path 48 being in the opposite direction. An example of such an application is discussed further below with reference to FIG. 10.

In the present embodiment, the trim 44 includes a wedge-shaped member 50 (a "wedge") and a cage 52. Here, the cage 52 constitutes a generally fixed component while the wedge 50 is movable. For instance, the wedge 50 may include a protruding member 56 (best shown in FIG. 7) that enables it to be coupled to a stem 54. The actuator 42, which is depicted in FIG. 3 as including a handle 58, is configured to drive the stem 54 a linear direction along the horizontal axis 60, which may represent the center axis of the cage 52 having a cylindrical body in the present embodiment. Thus, depending on the direction of actuation (e.g., the direction in which the handle is rotated), the stem 54 may cause the wedge 50 to move towards or away from the cage 52. As can be appreciated, the actuator 42 may be controlled manually or, as is typically the case in subsea applications, remotely, such as by using a remotely operated vehicle (ROV). In some embodiments, rather than having a handle 58, the actuator 42 may include a hydraulic or electric motor to control the position of the stem 54 in order to bring the wedge 50 to a desired position.

The wedge 50 of the trim 44 includes a top surface 64 which is parallel to the axis 60 and a bottom surface 66 which is arranged at an angle 68 with respect to the surface 64, thus essentially forming the wedge-like shape of the wedge 50, wherein the angle 68 is an acute angle less than 90 degrees. By way of example, the angle 68 may be between approximately 15 to 60 degrees in one embodiment. In the illustrated embodiment, the ends of the surfaces 64 and 66 distal to the stem 54 meet at a right-side surface 70 arranged perpendicularly with respect to the first surface 64. In other embodiments, the wedge 50 may lack the surface 70, and the surfaces 64 and 66 may instead meet directly forming an edge (which would appear as a vertex in the cross-sectional view shown in FIGS. 3 and 4). The wedge 50 also includes a left-side surface 72 that meets each of the surfaces 64 and 66 at the ends proximal to the stem 54. When the wedge 50 is securely coupled to the stem 54, as shown in FIG. 4, the surface 72 is directly adjacent to the surface 74 of the stem 54. The wedge 50 also includes a front surface 76 and rear surface 78, as shown best in FIG. 7. It should be understood that the positional terms top, bottom, right, left, front, and rear describe the surfaces of the wedge 50 based on the orientation of the wedge as shown in FIGS. 3 and 4, i.e., with the surface 64 being parallel to the horizontal axis 60. Thus, these positional terms may be adjusted accordingly if the orientation of the wedge 50 differs in other embodiments.

In the illustrated embodiment, the cage 52 configured to receive the wedge 50 has a generally cylindrical body with an opening 82 extending therethrough from a first end 80 (closest to the stem 54) to a second end 81 (furthest from the stem 54), as is best shown in FIG. 6. Here, the opening 82 is defined by an upper surface 84, side surfaces 86 and 88, and lower surfaces 90 and 92. The distance 94 (best shown in FIG. 5) between the side surfaces 86 and 88 is approximately equal to the width of the wedge 50, so that the wedge 50 is able to be inserted into the opening 84. As the wedge 50 extends into the opening 82, the top surface 64 of the wedge 50 is directly adjacent to the surface 84, while the front surface 76 and the rear surface 78 are directly adjacent to the surfaces 86 and 88, respectively. As shown best in FIG. 4, the cage 52 also includes the sealing members 83 and 85, which may be O-rings in one embodiment.

As used herein, the phrase "directly adjacent" is intended to mean that at least a portion of two surfaces in question are in direct contact with one another, although the entirety of these surfaces are not necessarily in direct contact. To provide an example with respect to the position of the wedge 50 shown in FIG. 4, the surface 64 of the wedge 50 directly contacts a portion of the surface 84 inside the opening, and thus may be considered as being directly adjacent to the surface 84 even though a portion of the surface 84 nearest to the end 81 of the cage 52 is not in contact with the surface 64. Further, it is understood that where surfaces of the wedge 50 and the cage 52 directly contact one another during operation, the flow of fluid is substantially impeded. That is, fluid is generally unable to flow between two surfaces directly contacting one another.

As shown best in FIG. 4, the lower surfaces 90 and 92 are both angled with respect to the axis 60 and meet at a vertex 96. Particularly, the surfaces are oriented in the present embodiment such that the surface 90 is parallel to the surface 66 of the wedge 50 and such that the opening 82 gradually decreases in size from the end 80 to the vertex 96. The surface 92 is angled in the opposite direction with respect to the surface 90, such that the remainder of the opening 82 from the vertex 96 to the end 81 gradually increases in size. In the depicted embodiment, the surface 92 is arranged at an angle 95 to form a diffuser outlet that directs flow downstream and retards the flow velocity in a gradual fashion. Further, in other embodiments, the surface 92, instead of being angled, may be parallel to the axis 60.

As discussed above, the trim 44 provides a throttling area that creates a restriction in the flow path 48. This throttling area, referred to by reference number 100, is formed as an orifice (e.g., an open space) between the two parallel surfaces, namely surface 66 of the wedge 50 and surface 90 within the opening 82 of the cage 52. As can be appreciated, the distance 102 (best shown in FIG. 5) between the surfaces 66 and 90 is dependent on the linear position of the wedge 50 which, as discussed above, may be controlled by the actuator 42. For example, the distance 102 may be decreased, thus decreasing the size of the throttling orifice 100, by moving the wedge 50 such that it extends further into the opening 82. Similarly, the size of the throttling orifice 100 may be increased by moving the wedge 50 away from the cage, thus increasing the distance 102. Further, while being shown as parallel in the present embodiment, it should be understood that the surface 66 of the wedge 50 and the surface 90 of the cage 52 need not necessarily be parallel provided an open space can be formed between these two surfaces to allow fluid to pass through. It should also be noted that the wedge and cage trim 44 could also be implemented as a non-adjustable choke, wherein the wedge 50 and cage 52 are both fixed. In the latter case, the distance 102 is also fixed and the size of the throttling orifice 100 is generally constant.

During operation, fluid flowing along the flow path 48 (e.g., from conduit 38 to conduit 40) will enter the throttling orifice 100 of the trim 44. Because the throttling orifice 100 creates a restriction in the flow path 48, fluid entering the throttling orifice 100 will accelerate, thus increasing in flow velocity, while pressure drops. This is due to energy in the fluid being converted into momentum. As the fluid exits the throttling area and continues along the flow path 48, the fluid will decelerate, thus decreasing in velocity, while pressure recovers. In this manner, a choke may be used for many purposes in resource extraction applications, such as controlling flow, protecting equipment from erosion and abrasion, as well as to control circulation and surface pressures. Erosion wear is typically caused by the impingement of particles, liquids, bubbles, and/or droplets against a solid surface, typically at high velocities. Thus, since fluid flow typically increases in velocity within a throttling orifice, this region of a choke is more susceptible to erosion.

In the present embodiment, the primary erosion and abrasion zones of the wedge and cage trim 44 where flow restriction occurs is dispersed over a larger area, i.e., across the two parallel surfaces, when compared to certain conventional trim designs, such as a needle and seat trim. For instance, in the case of a needle and seat trim, the throttling area may be viewed as the space between a circumferential surface on the needle and a circumferential surface on the seat. Thus, the erosion and abrasion zones of a needle and seat trim are heavily concentrated along these circumferences, which may cause the components of a needle and seat trim to erode and wear more quickly relative to the wedge and cage trim 44 discussed above. An example of a needle and seat trim will be discussed below briefly with reference to FIG. 9. By dispersing the erosion and abrasion zones across a larger area, as is the case in the illustrated wedge and trim 44 of FIGS. 3 to 7, the operational life of the choke 30 may be extended. Thus, this enhanced resistance to erosion-related and abrasion-related wear is at least one advantage the wedge and cage trim 44 of the present disclosure provides over certain conventional trim designs. Additionally, the geometric profile of the wedge and cage trim 44 inhibits recirculation of fluid and the occurrence of vortices that can have a shearing effect on the fluid.

The wedge and cage trim 44 of FIGS. 3 to 7 also provides positive shut-off capability. That is, the trim 44 is capable of completely stopping the flow of fluid through the choke 30. It should be noted that positive shut-off is not a capability that is provided with all choke valve devices. For instance, chokes that utilize fixed bean trims designs generally lack the ability for positive shut-off. In other trim designs, such as a needle and seat trim, the ability for positive shut-off may or may not be provided, depending on the manufacturer. However, for certain existing chokes that do provide positive shut-off capability, this shut-off point is the same point as the throttling point. For example, a choke having a needle and seat trim may provide positive shut-off capability by allowing for the needle to seat fully on the seat, thus fully obstructing the flow path. However, as can be appreciated, this may not always form an adequate seal, as the materials used for such trim components are usually metal in nature. Thus, as these metals erode over time, leakage may increase.

As discussed above, the wedge and cage trim 44 provides a seal 83 on the cage 52, as best shown in FIG. 4. Thus, when the wedge 50 is controlled to a position where it is fully disposed within the opening 82, the end 74 of the stem 54 will come into contact with the seal 83 located at the end 80 of the cage 52. Thus, the cage 52, stem 54, and seal 83 positively shuts off the flow through the choke 30 at the location of the seal 83, which is different from the throttling orifice 100 created between the wedge 50 and the cage 52. In conjunction with the use of the seal 83, this may provide improved positive shut-off functionality with reduced leakage.

During resource extraction, it is not uncommon to encounter debris in the flow of extracted materials, which may be a mixture of oil, water, gas, and solid particulates. Thus, if solid debris becomes stuck in a given flow path, such as within the throttling orifice of a choke, a blockage may occur and disrupt production. With this in mind, the wedge and cage trim 44 of the present disclosure may provide improved tolerance for debris encountered during operation relative to certain existing trim designs, such as the aforesaid needle and seat trim. For example, referring to FIGS. 8 and 9, these figures show simplified cross-sectional views of throttling orifices for a wedge and cage trim and a needle and seat trim, respectively, wherein the throttling orifices have equal cross-sectional areas.

Figure 8:
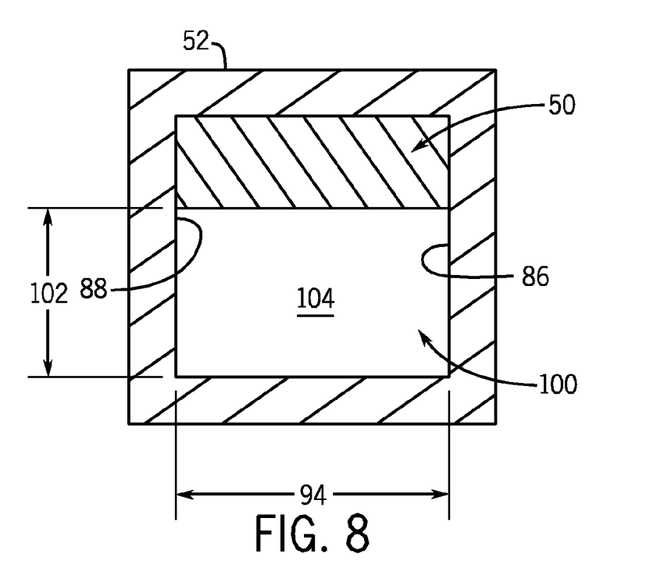
FIG. 8 shows the cross-sectional shape of a throttling orifice provided by a wedge and cage trim in accordance with aspects of the present disclosure.
Figure 9:
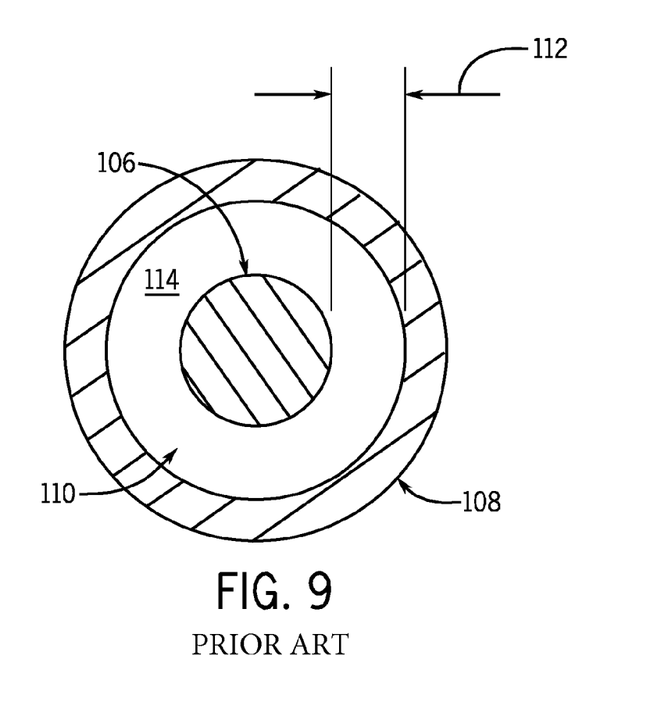
FIG. 9 shows the cross-sectional shape of a throttling orifice provided by a conventional needle and seat trim.

As shown in FIG. 8, the rectangular cross-sectional area 104 of the throttling orifice 100 is determined based upon the distance 102 between the wedge 50 and the cage 52 and the width 94 between the side surfaces 86 and 88 of the opening 82 in the cage 52. In FIG. 9, a needle and seat trim includes a needle 106, which may represent a movable component, and a seat 108, which may represent a fixed component. A throttling orifice 110 is formed based on the distance 112 between the needle 106 and seat 108, which may be variable depending on the position of the needle 106. Thus, the annular cross-sectional area 114 of the orifice 110 may decrease as the needle 106 is moved closer to the seat 108 and increase as the needle 106 is moved further away from the seat 108. In FIGS. 8 and 9, it is assumed that the wedge 50 and the needle 106 are positioned such that the cross-sectional areas 104 and 114 of their respective throttling orifices 100 and 110 are substantially equal. However, as can be seen from these figures, the rectangular cross-sectional area 104 has a lesser degree of obstruction when compared to the annular cross-sectional area 114. Thus, even though the areas 104 and 114 are equal in size, physically larger objects (e.g., particles) are able to pass through the throttling orifice 100 when compared to the throttling orifice 110. In this manner, the wedge and cage trim 44 described above with reference to FIGS. 3 to 7 provides for improved tolerance to debris in a flow path when compared to certain conventional trim designs, such as the needle and seat trim shown in FIG. 9.

As discussed generally above, chokes generally operate by creating a restriction in a flow path. For instance, chokes include a trim that provides a throttling orifice, which may or may not be variable. The restriction created by the throttling orifice causes a drop in pressure level as the fluid flows through the orifice. The pressure may subsequently recover downstream of the orifice. However, if fluid pressure drops quickly to a level that is less than vapor pressure, bubbles may form in the fluid. A quick subsequent recovery of the pressure to a level above the vapor pressure may result in the rapid collapse of such bubbles, which may cause shock waves that increase the turbulence in the fluid flow. This phenomenon known as cavitation, which can be a significant cause of wear in choke devices.

Figure 10:
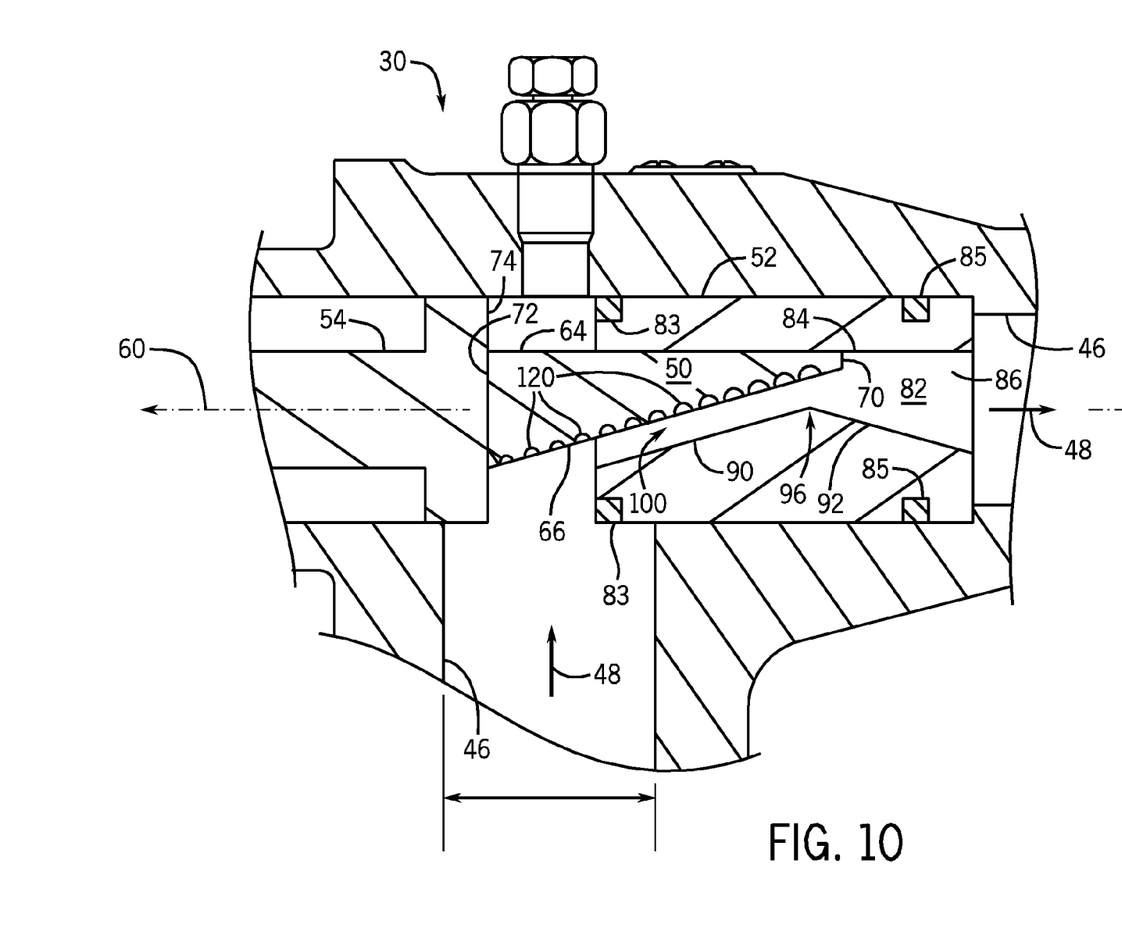
FIG. 10 is a cross-sectional view of the wedge and cage trim, as illustrated in FIG. 4, but with the addition of features to provide for multi-stage pressure drop control in accordance with aspects of the present disclosure.

Referring now to FIG. 10, the wedge and choke trim 44 described above with reference to FIG. 4 may also be adapted to provide multi-stage pressure drop control. That is, the drop in pressure within the throttling orifice may occur in a more gradual controlled manner so as to avoid or reduce cavitation, thus reducing the rate of wear and prolonging the life of the trim 44. Particularly, the multi-stage pressure drop control is provided by way of a series of grooves 120 formed on the angled surface 66 of the wedge 50. In the illustrated embodiment, the grooves 120 are semi-cylindrical in shape and oriented such that they extend across the surface 66 between the front surface 76 and rear surface 78 of the wedge 50 in a direction that is substantially perpendicular to the axis 60. As can be appreciated, the size, spacing, and shape of the grooves 120 may vary between different embodiments. In the illustrated embodiment, the grooves 120 may become progressively larger along the length of the surface 66 beginning from the end closest to the stem 54. In other embodiments, the grooves 120 may all have the same size.

Figure 11:
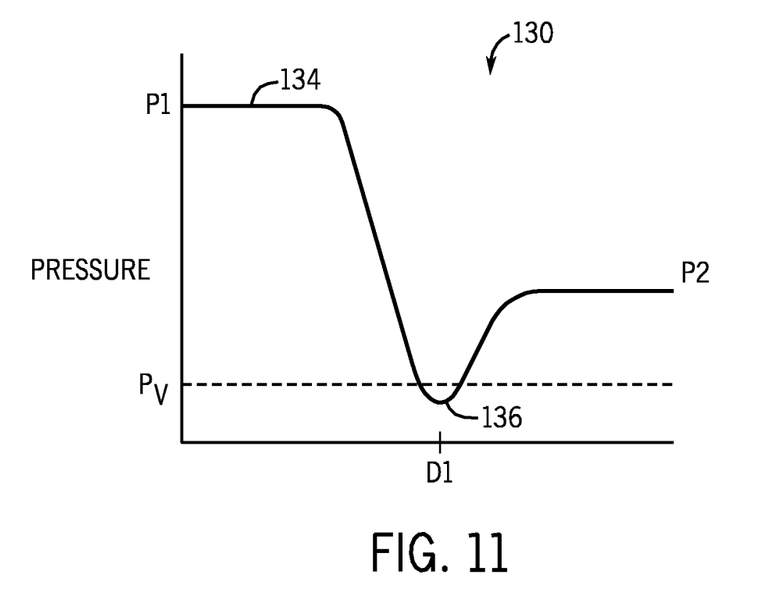
FIG. 11 is a graph showing the change in pressure levels in a choke that lacks multi-stage pressure drop control.
Figure 12:
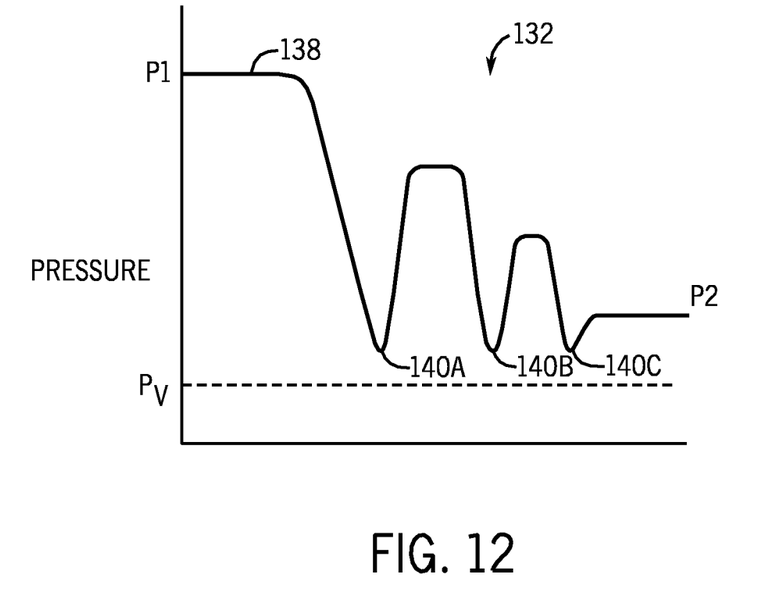
FIG. 12 is a graph showing the change in pressure levels in a choke that provides multi-stage pressure drop control in accordance with aspects of the present disclosure.

The benefits of having multi-stage pressure drop control, as provided by the embodiment of the trim 44 in FIG. 10, is better illustrated by comparing the graph 130 of FIG. 11 to the graph 132 of FIG. 12. Specifically, the graph 130 of FIG. 11 represents changes in pressure levels in a choke that lacks multi-stage pressure drop control, while the graph 132 of FIG. 12 represents changes in pressure levels in a choke that provides multi-stage pressure drop control, such as the wedge and trim choke 44 in FIG. 10. Referring first to the graph 130, the y-axis of the graph represents pressure while the x-axis represents position along the flow path through the choke. The curve 134 represents changes in pressure levels through the choke. The level P1 represents the fluid pressure prior to entering the choke, and the level P2 represents the fluid pressure after leaving the choke. Upon entering the choke, the pressure level drops (at position D1) as indicated by the dip 136. In the present example, the level $P_V$ represents the vapor pressure level. If the pressure drops below $P_V$ and then quickly rises again to a level above $P_V$, as is the case in the graph 130, cavitation may occur.

In comparison, a multi-stage pressure drop control example is depicted by graph 132 in FIG. 12. Here, the x- and y-axis represent the same variables as in FIG. 11, and the curve 138 represents changes in pressure levels through a choke that provides multi-stage pressure drop control. As shown here, multiple dips 140A-140C in the pressure level occur as the fluid flows through the choke. However, due to the presence of the grooves 120, some degree of pressure recovery also occurs after each dip 140. Thus, in the present example, the pressure does not fall below $P_V$ while the fluid flows through the choke, thereby avoiding or at least reducing cavitation.

In certain applications, it may be desirable to reduce shear in the fluid flowing through the choke. For instance, as mentioned above, the pressure of a producing well generally drops over time. Accordingly, it may be beneficial to inject water into the well to increase pressure, thus aiding in the extraction of oil. However, because the water and oil tend to mix, the cost of separating oil and water may increase overall production costs. One solution is to inject long chain polymers into the well along with the water during the injection process. The long chain polymers may help keep the oil and water separate. Such applications are sometimes referred to as enhanced oil recovery systems. Examples of long chain polymers that may be used in such applications include polyoxyethylene and polyacrylamide. However, when exposed to tortuous paths with a high degree of shear, long chain polymers have a tendency to break down, thus losing their effectiveness.

Figure 13:
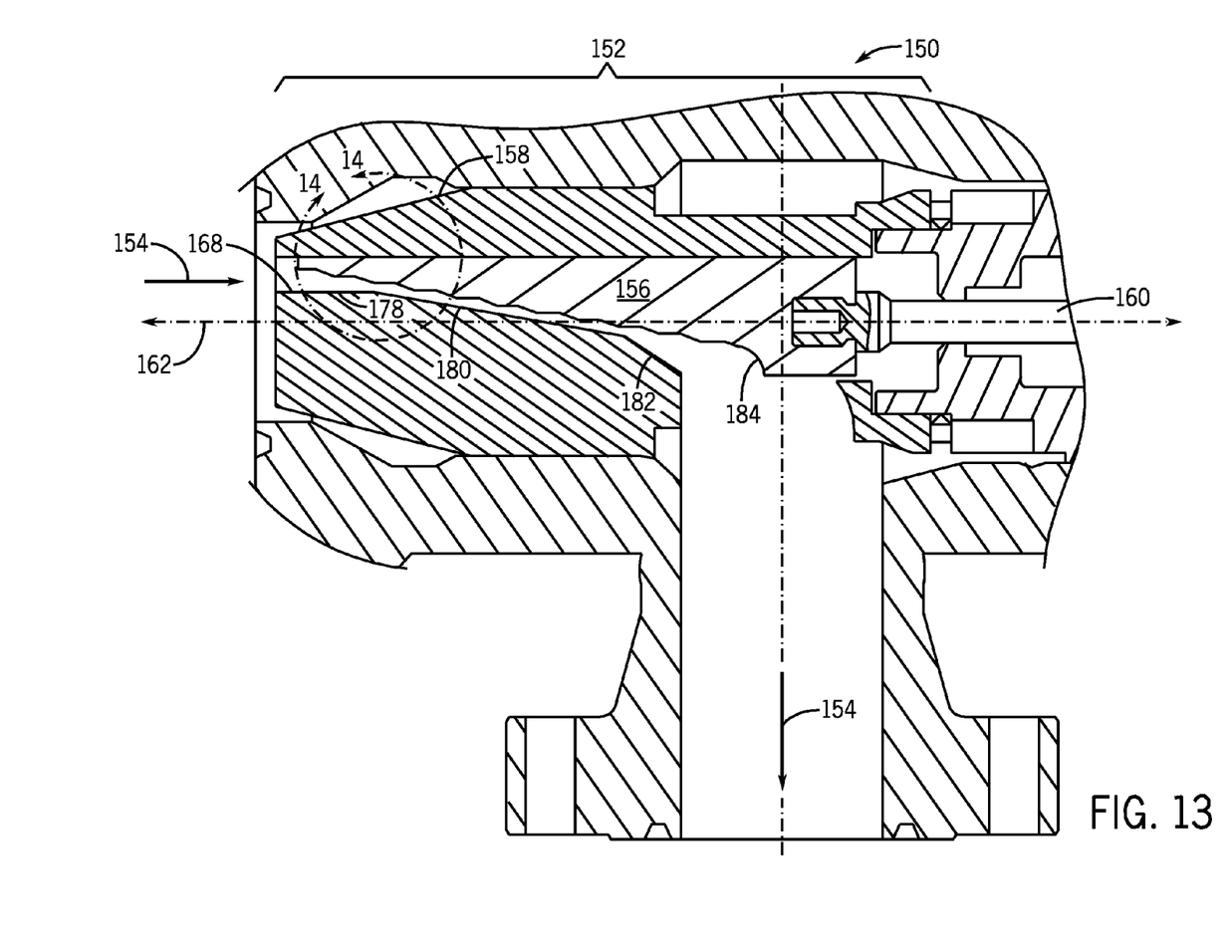
FIG. 13 is a cross-sectional cutaway view showing an embodiment of a choke having a wedge and cage trim that provides reduced shear, with flow in the reverse direction compared to a typical choke, in accordance with aspects of the present disclosure.
Figure 14:
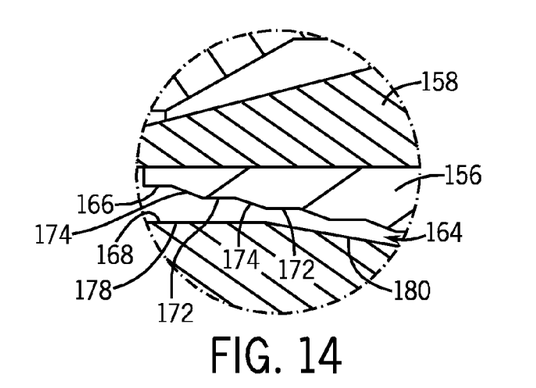
FIG. 14 is a more detailed view of the wedge and cage trim of FIG. 14 within the area enclosed by line 14-14 of FIG. 3.

Accordingly, the wedge and cage trims discussed herein also include embodiments that help to reduce shear in the flow path through a choke, as are shown in FIGS. 13 and 14. Specifically, FIG. 13 illustrates an embodiment of a choke 150 that includes a wedge and cage trim 152 that reduces shear. FIG. 14 is a more detailed view of the wedge and cage trim 152 focusing on the region enclosed by line 14-14 of FIG. 13. As shown in FIG. 13, the choke 150 has a flow path 154. In this example, the direction of the flow path 154 is indicative of an injection application, wherein materials, such as water and a long chain polymer, are being injected into a well.

The trim 152 includes a wedge 156 and a cage 158. Like the embodiments discussed above in FIGS. 3 to 7, the position of the wedge 156 may be adjusted by an actuator (not shown in FIG. 13) that is connected to the wedge 156 by way of a stem 160. A horizontal axis 162, which passes through the center of the stem 160 in the present embodiment, is depicted in FIG. 13 for reference. Here, the wedge 156 is adapted to be received in an opening of the cage 158 to form a throttling orifice 164 between the surface 166 of the wedge 156 and the surface 168 of the cage 158. In the present embodiment, the surface 166 of the wedge 156 is formed as a step-like contour, best shown in FIG. 14. Specifically, the contoured surface 166 alternates between a first set of segments 172 that are each substantially parallel to the axis 162 and a second set of segments 174 that are each angled with respect to the axis 160. In this embodiment, each of the segments 174 is arranged at the same angle (and thus parallel to one another). Thus, each "step" of this multi-step contoured surface 168 may be considered as including a parallel segment 172 and a directly adjacent angled segment 174. Further, in other embodiments, the angled segments 174 may be angled at different angles.

Beginning from the end of the cage 158 furthest from the stem 160, the surface 168 within the opening of the cage 158 includes a first segment 178 that is substantially parallel to the axis 162. The segment 178 allows for the throttling orifice 164 to gradually lead in to the first angled segment 180. The segment 180 is arranged at an angle with respect to the axis 162. Approaching the opposite end of the cage 158 (closest to the stem 160), the first angled segment 180 meets a second angled segment 182. The segment 182 is also arranged at an angle with respect to the axis 162, but may be arranged at a greater angle relative to the segment 180. This greater angled segment 180, which may be referred as a diffuser angle, helps to slow flow velocity and reduce circulation and vortices as the fluid begins to exit the throttling orifice 164. Some embodiments may lack the segment 182 and, instead, the segment 180 may continue to the end of the cage 158.

Overall, the throttling orifice 164 formed between the contoured surface 166 of the wedge 156 and the surface 168 of the cage 158 may help reduce shear stress, which is beneficial for applications involving the use of long chain polymers. Particularly, the flow path through the trim is similar to a capillary and in operation the throttling orifice 164 creates a gradual (rather than shearing) drop in fluid pressure. Further, the wedge 156 in the present embodiment may include a radius 184 located downstream (with respect to the flow path 154 shown in FIG. 13) from the contoured surface 166. This radius 184 helps to sweep the fluid exiting the trim 152 downstream along the flow path 154 while helping to limit increase in shear. While the embodiment shown in FIGS. 13 and 14 is described as being used in conjunction with applications for injecting fluids, such as water with long chain polymers, similar embodiments could also be used in applications for retrieving produced fluids from a well in which reduced shear and reduced recirculation is desired.

With respect to the various embodiments of the wedge and cage trims discussed in the preceding figures, these trims may be manufactured using any suitable type of materials, such as steel, tungsten carbide (WC), or another material having high resistance to erosion. In forming the components of a wedge and cage trim, these materials may be formed into appropriate shapes using any suitable manufacturing technique. By way of example, in one embodiment, wire cutting electrical discharge machining (EDM) may be used to form the components of the trim. Further, while discussed herein primarily in the context of chokes, it should be understood that the wedge and cage trim described herein may be used in conjunction with any type of flow control device, and is not specifically limited to chokes.

Figure 15:
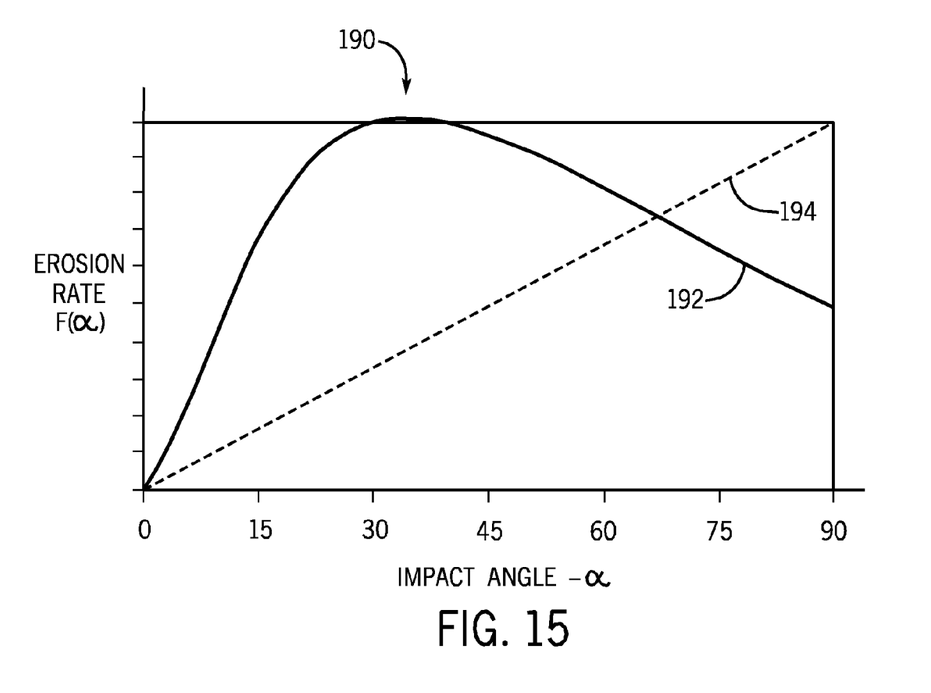
FIG. 15 is a graph comparing the erosion rates of steel and tungsten carbide as a function of impact angle.

As can be appreciated, a material such as tungsten carbide may offer certain benefits over steel. For instance, although steel is generally more ductile than tungsten carbide, tungsten carbide has a lower wear rate at low impact angles. For instance, referring to FIG. 15, a graph 190 comparing the erosion rates of steel and tungsten carbide as a function of impact angle is provided. The graph 190 includes a first curve 192 that represents the erosion rate of steel based on impact angle and a second curve 194 that represents the erosion rate of tungsten carbide based on impact angle. As can be seen from the graph 190, the erosion rate of tungsten carbide with respect to impact angle is much more linear compared to steel. Further, at lower impact angles, all the way from 0 degrees to approximately 65 degrees, tungsten carbide wears at a lower rate compared to steel. However, beyond impact angles of approximately 65 degrees, steel performs better in terms of erosion. Accordingly, while both materials are suitable for manufacturing the wedge and cage trims disclosed herein, tungsten carbide offers certain advantages in applications with lower impact angles.

While the aspects of the present disclosure may be susceptible to various modifications and alternative forms, specific embodiments have been shown by way of example in the drawings and have been described in detail herein. But it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. An apparatus comprising:
a wedge-shaped member of a valve, the wedge-shaped member having a first surface and a second surface that is angled with respect to the first surface;
a stem coupled to the wedge-shaped member; and
a cage of the valve, the cage having a main body that includes an opening that extends through the main body from a first end of the main body to a second end of the main body, the opening being formed by at least a third surface and a fourth surface of the cage and being configured to receive the wedge-shaped member through the first end of the main body such that: the first end of the main body is proximal to the stem, the second end of the main body is distal to the stem, a throttling orifice is formed as a space between the second surface and the fourth surface, and the stem can be moved into contact with a seal on the first end of the main body to fully impede flow of fluid through the throttling orifice.

2. The apparatus of claim 1, wherein the space between the second surface and the fourth surface is variable during operation of the valve depending on the position of the wedge-shaped member within the cage.

3. The apparatus of claim 2, wherein the wedge-shaped member is coupled to an actuator by the stem, and the actuator enables control of the position of the wedge-shaped member within the opening through movement of the stem.

4. The apparatus of claim 2, wherein the cage and the wedge-shaped member are constructed such that the space between the second surface and the fourth surface decreases as the wedge-shaped member is positioned further into the opening and increases as the wedge-shaped member is positioned further out of the opening.

5. The apparatus of claim 1, wherein the wedge-shaped member is received within the opening of the cage and the second surface and the fourth surface are substantially parallel.

6. The apparatus of claim 1, wherein the wedge-shaped member is received within the opening of the cage, the fourth surface comprises a first portion and a second portion that meet at a vertex, the first portion of the fourth surface is substantially parallel to the second surface, and the second portion of the fourth surface is not substantially parallel to the second surface.

7. The apparatus of claim 6, wherein the second portion of the fourth surface is angled with respect to the first surface, but at a different angle than with respect to the second surface.

8. The apparatus of claim 1, wherein the second surface of the wedge-shaped member is substantially flat.

9. The apparatus of claim 1, wherein the second surface of the wedge-shaped member comprises a set of grooves configured to provide multi-stage pressure drop control.

10. The apparatus of claim 9, wherein the grooves are substantially semi cylindrical in shape and are arranged perpendicularly with respect to an axis through the opening of the cage.

11. A system comprising:
a wedge-shaped component;
a stem coupled to the wedge-shaped component;
an actuator configured to move the stem to vary the position of the wedge-shaped component; and
a cage disposed in a passage of the system, wherein the cage includes a substantially cylindrical body with a first end proximal to the stem and a second end distal to the stem and an opening that extends through the body;
wherein the actuator is configured to at least partially restrict the flow of a fluid through the passage by positioning the wedge-shaped component into the opening such that a throttling orifice is formed between a first surface of the wedge-shaped component and a second surface inside the opening, and to fully impede the flow of the fluid through the passage by moving the stem such that a surface of the stem fully contacts a seal disposed on the first end of the body of the cage.

12. The system of claim 11, wherein a positive shut-off point is formed when the surface of the stem fully contacts the seal, the positive shut-off point being separate from the throttling orifice.

13. The system of claim 12, wherein the fluid is not permitted to flow through throttling orifice when the positive shut-off point is formed.

14. The system of claim 12, wherein, when the stem fully contacts the seal, the wedge-shaped component is fully inserted inside the opening of the cage.

15. The system of claim 12, wherein the actuator, stem, wedge-shaped component, and cage form a trim of a choke valve.

16. The system of claim 15, wherein the system comprises a resource extraction system, and wherein the choke valve is part of the resource extraction system.

17. The apparatus of claim 1, comprising a choke including the wedge-shaped member and the cage, wherein the choke is arranged to allow fluid to flow from an inlet of the choke to an outlet of the choke through the throttling orifice, and the direction of flow into the inlet is angled with respect to the direction of flow out of the outlet.

* * * * *